United States Patent [19]

Hosoya

[11] Patent Number: 5,332,460
[45] Date of Patent: Jul. 26, 1994

[54] METHOD OF MANUFACTURING A SEAL RING FOR MAGNETIC FLUID SEAL DEVICE

[75] Inventor: Masachi Hosoya, Fujisawa, Japan
[73] Assignee: Nippon Seiko Kabushiki Kaisha, Tokyo, Japan
[21] Appl. No.: 591,595
[22] Filed: Oct. 2, 1990

Related U.S. Application Data

[63] Continuation-in-part of Ser. No. 391,149, Aug. 8, 1989, abandoned.

[30] Foreign Application Priority Data

Aug. 9, 1988 [JP] Japan .................................. 63-197054

[51] Int. Cl.⁵ ............................................. B29B 13/02
[52] U.S. Cl. ................................ 156/242; 156/306.6; 156/308.2; 156/309.6; 277/80; 29/609
[58] Field of Search ............... 156/306.6, 308.2, 309.6, 156/307.1, 309.9, 242, 320; 277/80; 29/609; 264/DIG. 58; 384/133, 446

[56] References Cited

U.S. PATENT DOCUMENTS

| | | | |
|---|---|---|---|
| 2,188,091 | 1/1940 | Baermann, Jr. | 264/DIG. 58 X |
| 3,070,841 | 1/1963 | Schornstheimer | 264/DIG. 58 X |
| 4,427,481 | 1/1984 | Smith et al. | 156/309.6 X |
| 4,489,950 | 12/1984 | Chorney | 277/80 |
| 4,526,382 | 7/1985 | Raj et al. | 277/80 |
| 4,598,914 | 7/1986 | Furmura et al. | 277/80 |
| 4,693,775 | 9/1987 | Harrison et al. | 156/309.6 X |
| 4,769,166 | 9/1988 | Harrison | 277/80 X |
| 4,927,164 | 5/1990 | Raj et al. | 277/80 |

*Primary Examiner*—Jeff H. Aftergut
*Attorney, Agent, or Firm*—Thomas R. Morrison

[57] ABSTRACT

A seal ring for magnetic fluid seal device, comprising an annular magnet covered with heat activated resin and an annular pole piece stacked and pressed and bonded coaxially with said annular magnet at a temperature higher than heat activated temperature.

2 Claims, 3 Drawing Sheets

METHOD OF MANUFACTURING A SEAL RING FOR MAGNETIC FLUID SEAL DEVICE

This is a continuation in part of application Ser. No. 07/391,149 filed Aug. 8, 1989, now abandoned.

BACKGROUND OF THE INVENTION

1. Field of the Invention

This invention relates to a seal ring used for magnetic fluid seal device and its manufacturing method.

2. Description of the Prior Art

There is a magnetic fluid seal devices conventionally known and used practically for magnetic disk devices as shown in FIG. 2 and 3.

This device has been disclosed by the applicant of this invention in the Japanese Utility Model Laid-Open Publication No. 191423/1983.

In FIGS. 2 and 3, symbols are defined in such a manner as 1 for a cylindrical housing, 2 for a shaft mounted on the housing 1 via a bearing 3, R for a seal ring comprising annular pole pieces 4, 5 fixed on an annular magnet 6 at its both end surfaces, said seal ring being fixed with an adhesive onto the inner peripheries of an outer ring 3b of the bearing 3 by means of a seal gap g between pole pieces 4, 5 and an inner ring 3a of the bearing 3. The inner ring 3a is fixed onto the shaft 2 while fixing the outer ring 3b onto the housing 1. The inner ring 3a and pole pieces 4, 5 comprise magnetic substance. Symbol numeral 7 represents a magnetic fluid maintained by a magnetic force in said seal gap g, in other words it is a magnetic fluid maintained by a magnetic field generated by the magnet 6 between the inner ring 3a and seal member C. The device of sealing magnetic fluid comprises said seal ring R and said magnetic fluid 7. Numerals 8 represents a disk engaged in the shaft 2, while denoting a magnetic head by 9, a ball by 10, a ball retainer by 11 and a seal plate by 12. Thanks to such a configuration, the space between the seal ring R and the inner ring 3a is sealed by the magnetic fluid 7 maintained in between both members R and 3a, for preventing the entry of dust created from the bearing (grease dust), etc. into a clean zone. A magnet in said seal ring R used in a conventional device of sealing magnetic fluid is coated (hereinafter referred to as coating) with a resin. This coating aims to prevent magnet dust from entering into a clean zone. For example, when the seal ring R is integrated into HDD motor and the magnet contacts with the housing, magnet powder attaches to the housing This attached dust (the magnet powder) separates by vibration etc. from the housing and attaches to a disk surface, which causes to arise a head crash. Especially in dust from the magnet, the powder has a magnetic nature which causes a magnetic record error and gives rise to some problems.

However, said seal ring R, used in a conventional device of sealing magnetic fluid, due to different kinds between magnet coating agent with resin and adhesive for magnet and pole piece requires a process of covering the magnetic with a resin (hereinafter referred to as coating) and the other process of bonding the coated magnet and the pole pieces using an adhesive, during manufacture. In addition, this bonding process must have divided into 2 subprocesses.

In other words, conventional devices have been manufactured in the following procedures.

(1) First, an annular magnet is coated with a resin (wholly, or magnet inter or outer diameter surface) to manufacture an annular magnet 6 shown in FIG. 4 (a).

(2) This annular magnet 6 is rotated around an axis shown in FIG. 4 (a) and an adhesive 14 is coated on one surface using a dispenser 13, etc., without portions left uncoated.

(3) An annular pole piece 4 is stacked coaxially on the annular magnet 6 coated with the adhesive 14, pressed with a die 15 and both members 4, 6 are bonded together shown in FIG. 4 (b).

(4) The annular pole piece 4 and the annular magent 6, after being bonded into a body, are turned upside down and then the adhesive 14 is coated as shown in FIG. 4 (c) by the method described above on the opposite side (the other side) of the annular magnet 6.

(5) A second annular pole piece 5 is stacked coaxially with the first pole piece 4 on the annular magnet 6 coated with the adhesive, as shown in FIG. 4 (d), pressed with the die 15, thus 3 members 4, 5 and 6 are bonded together.

As described above, according to a conventional methods of manufacturing seal ring R, the first and second bonding processes are required, resulting therefore in many labor man-hours, much labor force and higher manufacturing cost as a matter of disadvantage.

SUMMARY OF THE INVENTION

The present invention has been accomplished to solve such conventional matter of disadvantage, intended for providing a method of manufacturing a seal ring for devices of sealing magnetic fluids with less labor man-hours and eventually less manufacturing cost. The method of manufacturing seal ring for devices of sealing magnetic fluids relate to a method comprising a first process of covering an annular magnet with a heat activated resin and a second process of stacking said annular magnet after being covered with said resin, coaxially with an annular pole piece and then pressing said magnet and said pole piece at a temperature higher than said heat activated temperature (resin melts, activates and solidifies to enable to adhere) of said resin.

According to a principle of the present invention, the resin melts to function as an adhesive between the magnet and the pole piece when both annular magnet and pole piece are stacked and pressed at temperature higher than said heat activated temperature.

As described above, the resin functions as a coating film of the magnet not to arise dust from the magnet while also acting as an adhesive between the magnet and the pole piece. Consequently, any process of coating an adhesive is no longer required, although it was needed according to the prior art.

DETAILED DESCRIPTION OF PREFERRED EMBODIMENTS

Figure 1A:
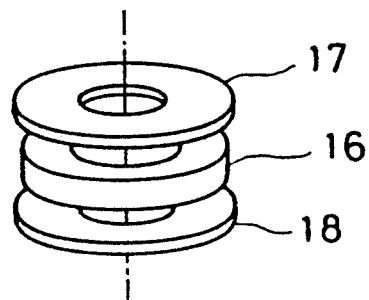
FIGS. 1 (a) and (b) are oblique views for describing the processes of an embodiment of the present invention.
Figure 1B:
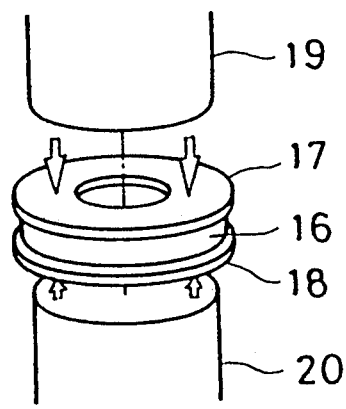
Figure 2:
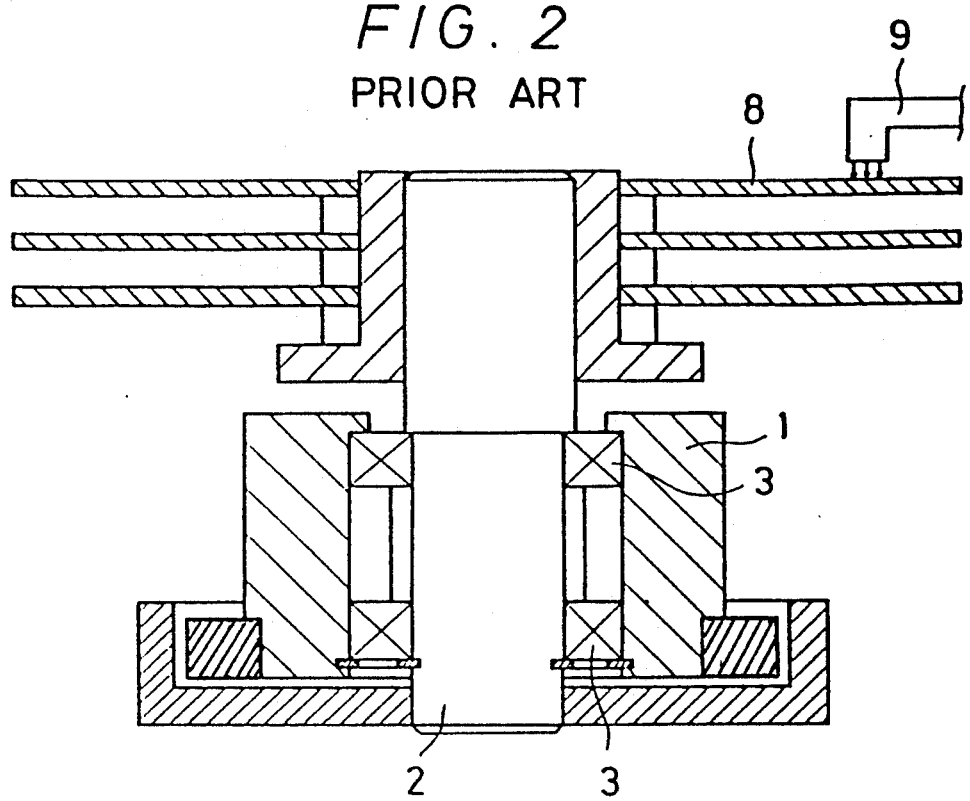
FIG. 2 shows a magnetic disk device using a conventional seal ring for a magnetic fluid seal devices.
Figure 3:
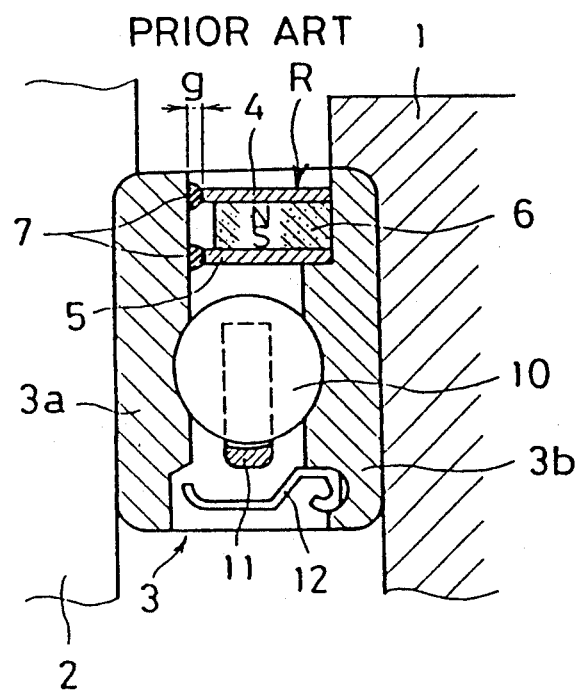
FIG. 3 is an enlarged sectional view of an important portion of FIG. 2.
Figure 4A:
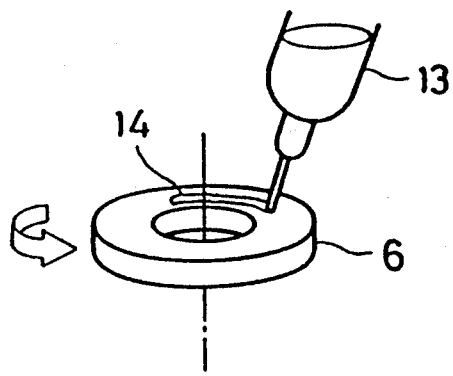
FIGS. 4 (a)-(d) are oblique views for showing the processes of manufacturing a seal ring in FIG. 3.
Figure 4B:
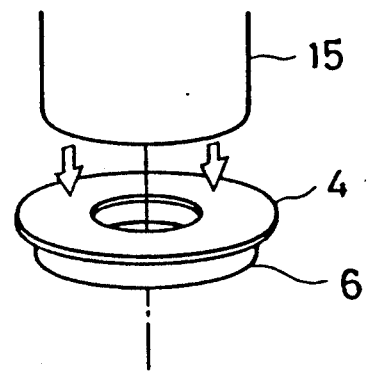
Figure 4C:
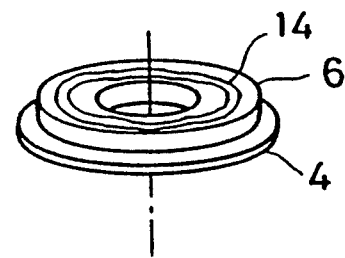
Figure 4D:
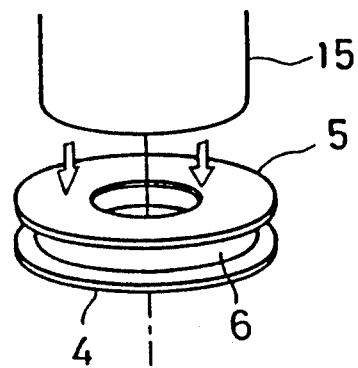

An embodiment of the present invitation is described step by step referring to FIG. 1.

(1) A phenoxy resin was coated by air spray on an annular magnet to manufacture an annular magnet 16 covered with the resin (the annular magnet surface is coated with resin melted by a solvent). At that time, said resin uses the material activated about 120° C. The resin was melted into a solvent of a boiling point under 120° C. by 15 wt. % and then coated. An air spray method applied for coating in a coating thickness of 10 um for the coated film (covering film).

(2) The magnet was atmospherically heated at 80° C. in order to vaporize a solvent left on the magnet surface.

(3) Next, said annular magnet 16 was sandwiched with two annular pole pieces 17, 18 as shown in FIG. 1 (a), stacked coaxially as shown in FIG. 1 (b) and pressed with dies 19, 20 vertically at a temperature of 150° C. The seal ring, thus manufactured, is structured in such a manner that the entire exposed portion of the magnet 16 was covered completely, in which the magnet 16 was not easily separable from the pole pieces 17, 18 and satisfactorily operable for practical uses. Said phenoxy resin must function as an adhesive. Therefore, it is preferable that its heat activated temperature is about 120°-200° C.

A method applied for coating a resin in an annular magnet may be one with air spray as well as others with drenching, hot airless spray or float coating. The method with hot airless spray is that a magnet enters in a cylinder, the cylinder rotates slowly, the magnet rotates in various directions in the cylinder, and a coating resin is heated at about 30°-60° C., atomized with lower viscosity, and coated and that the resin circulates through tube and nozzle with constant density, having the merits of non-overspray, of non fluid waste and of shorter process with sooner liquid vaporization due to spraying only by fluid pressure (airless). The method with float coating uses a spray (with air or airless) to spray floating magnet flown up by air and obtains uniform coating without any fluid dropping and any fluid attachment to others.

Hydrocarbon base solvents are more preferable. For example, cyclohexane, xylene, hexane, toluene, or acetone (simply or their mixture) is desirable. A preferred ratio of mixing a resin and a solvent is 3-20 wt. % because of assuring a maximum bonding force between the pole pieces 17, 18 and the magnet 16. A temperature to dry a magnet for vaporizing a solvent of the magnet surface is preferrable at under 90° C. and more desirable at 50°-80° C. A desirable range of coating film thickness is 5-30 um. If less than 5 um, bonding force becomes weak and, if in excess of 30 um, the resin may exude from the surface of bonding creating more dust.

Further, there can be used heat activated resins other than said phenoxy resin, which are described as hereunder.

1. phenol epoxy modified resin with heat activated temperature of 150°-200° C.
2. phenol nitrile rubber modified resin with heat activated temperature of 150°-200° C.
3. urethane base synthetic resin with heat activated temperature of 150° C.-200° C.
4. chloroprene base synthetic rubber with heat activated temperature of 100°-160° C.
5. modified butyl base synthetic rubber with heat activated temperature of 100°-160° C.
6. polyethylene resin with heat activated temperature of 100°-160° C.
7. polyamide base resin with heat activated temperature of 100°-160° C.

Said resins are desirable to use hydrocarbon base solvent with a mixing ratio (a resin and a solvent) of 5-20 wt. %.

Other than hydrocarbon base solvent, resin can use water as dispering solvent. Such resin uses of heat activated temperature of 100°-160° C.

With this embodiment of the present invention, the coated film when said annular magnet 16 is coated by the air spray etc. has the condition coated with the resin melted by the solvent, and then, is atmospherically dried at 50°-80° C., vaporizing the solvent dispersed the resin, leaving only the resin on the magnet surface, and forming the resin film (solid). Then, said solid resin film melts by pressing at the pressing temperature (150° C.), heat activates and bridges to function as an adhesive between the pole pieces 17, 18 and the magnet 16. In other words, the phenoxy resin as covered on the magnet 16 functions also as an adhesive as well as a coated film intended originally.

Consequently, conventionally required adhesive 14 is no longer needed while also allowing to eliminate 2 coating processes as required in the prior art. As a result, manufacturing cost can be reduced accordingly and thus seal ring with cheap cost and non-dust from magnet can be produced.

As described above, the adhesive function to bond the pole piece and the magnet and the magnet coating function not to create dust from the annular magnet make by using the same kind of the resin in the adhesive coating process to be also the magnet coating process by the resin, which enables to omit the magnet coating process by conventional adhesive 14.

To that extent, the cost of manufacturing the seal ring can be reduces and thus the cheap seal ring with non dust from the magnet can be produced.

What is claimed is:

1. A method of manufacturing a seal ring for a magnetic fluid seal device comprising
   providing an annular magnet,
   applying a covering film of a heat activated resin to the magnet in a film thickness in a range of 5-30 um,
   stacking the magnet coaxially between a pair of annular pole pieces, and
   pressing the pole pieces against the magnet while heating the resin to a temperature at least about that at which resin in the film thereof is caused to melt and function as an adhesive for bonding the pole pieces to the magnet therewith forming a seal ring for a magnetic fluid seal device.

2. A method of manufacturing a seal ring for a magnetic fluid seal device comprising
   providing an annular magnet,
   covering the magnet with a heat activated resin, by dissolving the resin in a solvent having a boiling point temperature of less than 120° C. spraying the dissolved resin onto the magnet and heating the sprayed magnet, at a temperature of approximately 80° C. for a time sufficient to vaporize the solvent,
   providing a pair of annular pole pieces,
   coaxially stacking the magnet between the pole pieces, and
   pressing the pole pieces against the magnet while heating the same at a temperature in excess of the activation temperature of the heat activated resin to bond the pole pieces to the magnet thereby forming a seal ring for a magnetic fluid seal device.

* * * * *